455-296 SR
FIP8106 OR 3,913,018
#32E 8

United Sta[tes Patent] [11] 3,913,018
Rasmussen [45] Oct. 14, 1975

[54] TIME SHARING RADIOMETER SYSTEM

[75] Inventor: Lyle E. Rasmussen, Arcadia, Calif.

[73] Assignee: The United States of America as represented by the Secretary of the Air Force, Washington, D.C.

[22] Filed: June 4, 1973

[21] Appl. No.: 366,909

[52] U.S. Cl. .................. 325/324; 325/473; 328/60
[51] Int. Cl.² .......................................... H04B 1/10
[58] Field of Search.... 179/15 AC, 15 BL; 325/323, 325/324, 472–476, 370, 363; 307/262, 269; 328/59, 60, 63; 329/106, 107; 343/205

[56] References Cited

UNITED STATES PATENTS

| | | | |
|---|---|---|---|
| 3,537,011 | 10/1970 | Escoula | 325/370 |
| 3,571,736 | 3/1971 | West | 329/106 |
| 3,601,634 | 8/1971 | Ebertin | 179/15 BL |

*Primary Examiner*—Robert L. Griffin
*Assistant Examiner*—Jin F. Ng
*Attorney, Agent, or Firm*—Joseph E. Rusz; Julian L. Siegel

[57] ABSTRACT

A time sharing demodulation system for radiometers using a pair of parallel field effect transistor channels, one of which is preceded by an inverter with the pair of channels being followed by an integrator. The field effect transistors are driven by a pair of drive signals each having a periodic square wave with the repetition frequency of a single time shared radiometer signal and having a pulse width equal to a time shared interval. The pair of drive signals are 180° out of phase with each other.

1 Claim, 9 Drawing Figures

TIME SHARING RADIOMETER SYSTEM

BACKGROUND OF THE INVENTION

This invention relates to radiometers, and more particularly to a driving technique for a time sharing demodulator.

The present invention is a time sharing demodulation system for radiometers having relatively high noise levels. As an example, where four demodulator inputs are denoted as W, X, Y, and Z, prior art attempts at cancelling noise have not been effective because the incoherent noise in the first half of the X or Z periods will not cancel the inverted noise in the second half of the corresponding X or Z period.

By using the system of the present invention there is a decrease in the noise at the output by a factor of two.

SUMMARY OF THE INVENTION

The technique described in the invention is designed to reduce the ΔT, or noise sensitivity, of radiometers with more than one data channel output from a single time shared radiometric channel. The ΔT of each channel is reduced to approximately the same level as can be obtained by a non-time shared Dicke Radiometer. Previous systems utilizing other demodulation practices had ΔT's larger by a factor 2, 4, or 8, depending on the time sharing modulation of the input and the desired output configuration.

It is therefore an object of the invention to provide a novel and improved demodulation system for time shared radiometers.

It is another object to provide a demodulation system for radiometers that has a greater noise sensitivity reduction than that used in the past.

It is still another object to provide a time shared radiometer system that reduces noise and extraneous signals by controlling synchronous drive signals.

These and other objects, features and advantages of the invention will become more apparent when taken in connection with the following description of the illustrative embodiment in the accompanying drawings.

DETAILED DESCRIPTION OF THE PREFERRED EMBODIMENT

Figure 1:
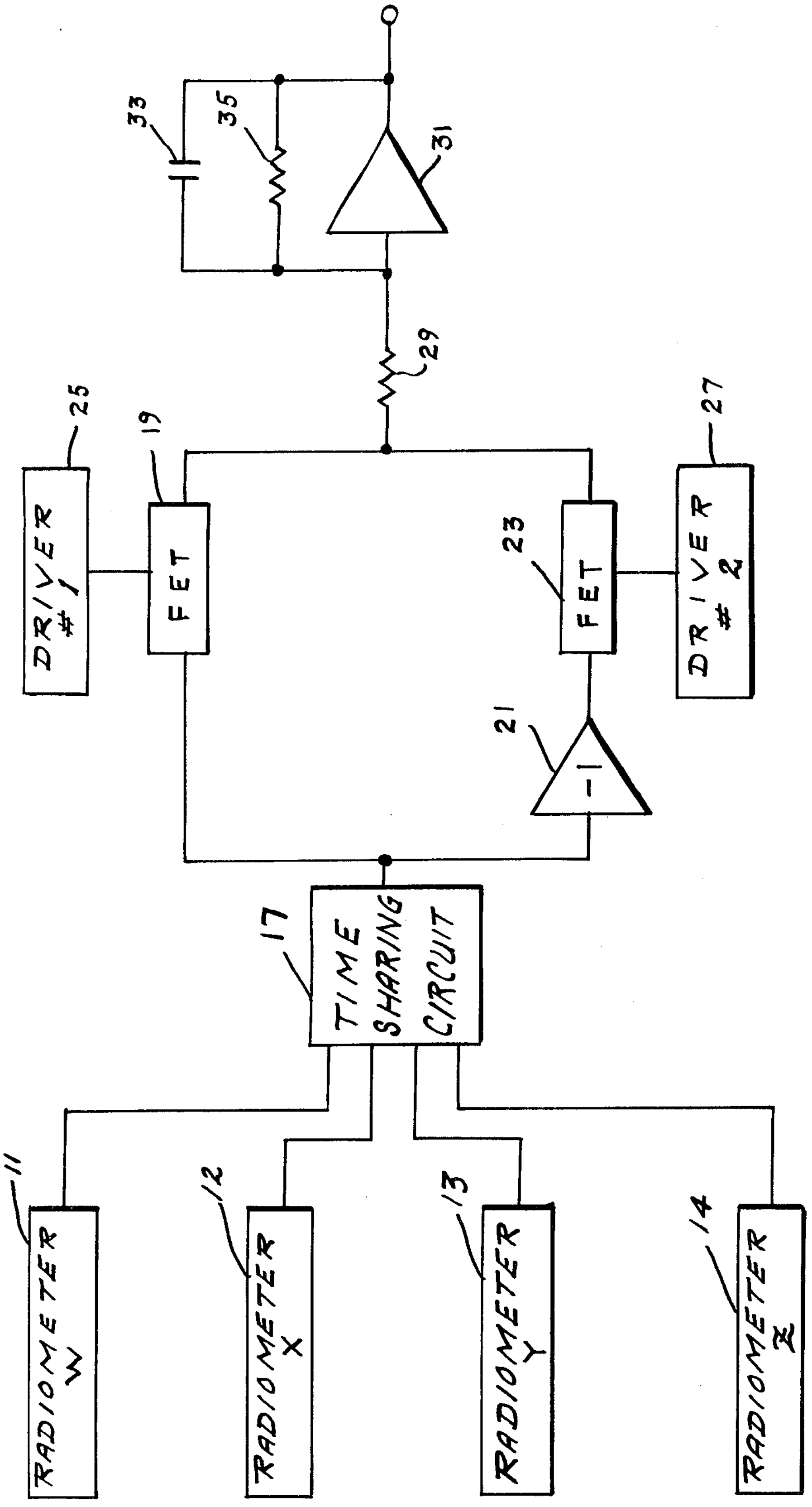
FIG. 1 is a block diagram of a typical time sharing demodulator.

Referring to FIG. 1, there is shown a block diagram of a time sharing radiometric demodulator to which the subject invention can be adapted. Radiometers 11–14 are each fed to time sharing circuit 17, the output of which is diverted to two channels, one to field effect transistor 19 and the other to inverter circuit 21, followed by field effect transistor 23. Field effect transistors 19 and 23 are gated by drivers 25 and 27. The outputs of these transistors are demodulated signals which are fed via resistor 29 to integrated amplifier 31 having feedback paths through capacitor 33 and resistor 35.

FIGS. 2*a*–2*d* show the waveforms used in a former system where W, X, Y, and Z are the inputs and it is desired to obtain an output of the DC average of $$\frac{W-Y}{4}.$$

Figure 2A:
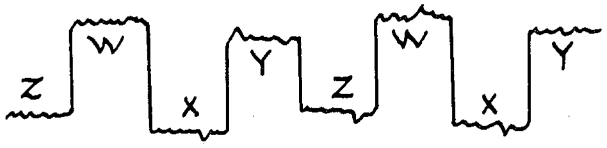
FIGS. 2*a*–2*d* are waveforms associated with the past technique of demodulating time shared radiometric signals.
Figure 2B:
Figure 2C:
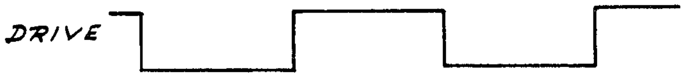
Figure 2D:

FIG. 2*a* shows the input signals with the accompanying noise. FIGS. 2*b* and 2*c* are the drive signals applied to field effect transistors 19 and 23 by drivers 25 and 27. This results in cancelling the unwanted signals according to the relationship $$W+\frac{X}{2}+\frac{Z}{2}-\left(Y+\frac{X}{2}+\frac{Z}{2}\right)=\frac{W-Y}{4},$$

which is shown in FIG. 2*d* where the shaded areas indicate the cancelled signals. Since the output of a radiometer is very noisy, the attempted cancellation of X and Z in FIG. 2*d* will not be completely effective because the incoherent noise of the first half of the X or Z period will not cancel the inverted noise in the second half of the X or Z period. The average of the noise riding on the cancelled portions of the waveform perhaps will be zero, however the noise occurring during these periods will add directly to the noise at the output of the radiometer.

Previous demodulation techniques as shown utilized continuous switching of the demodulator switches and cancellation of the undesired DC portions of the output, whereas this technique of this invention is based on the concept of allowing only the desired portions of the time shared outputs to pass through the demodulator.

Figure 3A:
FIGS. 3*a*–3*d* are waveforms associated with the present invention.
Figure 3B:
Figure 3C:
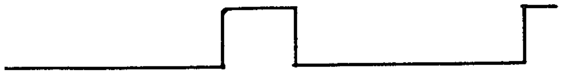
Figure 3D:
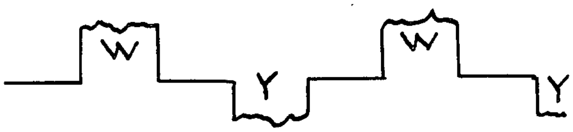

In FIGS. 3*a*–3*d* there is shown the waveforms for the novel system. The time shared input signals are shown as 3*a* and are the same as those in FIG. 2*a* showing the former system. The drive signals which are applied to field effect transistors 19 and 23 by drivers 25 and 27 are shown in FIGS. 3*b* and 3*c* and the output which is the desired DC output of $$\frac{W-Y}{4}$$

is shown in FIG. 3*d*. The hardware needed for obtaining the required drive signals can be obtained by any of the well known methods of generating synchronized square waves such as that shown in U.S. Pat. No. 3,441,751 issued to G. P. Benedict on Apr. 29, 1969 which describes a "Two-Phase Clock Pulse Generator". Although the waveforms shown are 180° out of phase in the present invention, other phase relationships can be used.

As can be seen in FIG. 3*d*, the output will not be susceptible to any noise during the X or Z period because neither of the FET switches is turned on at that time. By using this present technique and preventing these undesirable portions of the signal from passing, the noise at the output is decreased by a factor of two. This decrease in the output noise produces a similar decreased in the ΔT of the channel since the calculation of the ΔT is made by measuring the rms value of the noise at the output of the integrating amplifier and dividing by the sensitivity of the channel. Similarly, if the demodulation process is designed to take only two periods out of eight, as compared to two periods out of four for the above example, the improvement in ΔT by using this new technique will be approximately a factor of four.

The synchronous demodulator drive signals prevent noise and extraneous signals, occurring during other-channel modulation periods, from affecting desired portions of a time shared radiometric channel by not allowing conduction through the field effect transistors during the unwanted periods.

What is claimed is:

1. In a system for time sharing of a plurality of radiometric signals where each of the time shared signals has a time shared repetition period and a time sharing interval period and where the signals are fed to a pair of parallel field effect transistor channels each having a drive input with one of the channels being preceded by an inverter and the combined outputs of the two channels are followed by an integrator, the improvement comprising means for generating a pair of drive signals, said drive signals being 180 degrees out of phase, where each of said drive signals is a square wave having a repetition period equal to the time shared repetition period of one of the radiometric signals and a pulse width equal to the time sharing interval period of said one radiometric signal.

* * * * *